March 19, 1940.　　　　E. J. HOUDRY　　　　2,193,816
CHEMICAL CONVERTER
Filed Oct. 29, 1937　　　2 Sheets-Sheet 1

INVENTOR
Eugene J. Houdry
BY
Ira L. Nickerson
ATTORNEY

March 19, 1940.  E. J. HOUDRY  2,193,816
CHEMICAL CONVERTER
Filed Oct. 29, 1937   2 Sheets-Sheet 2
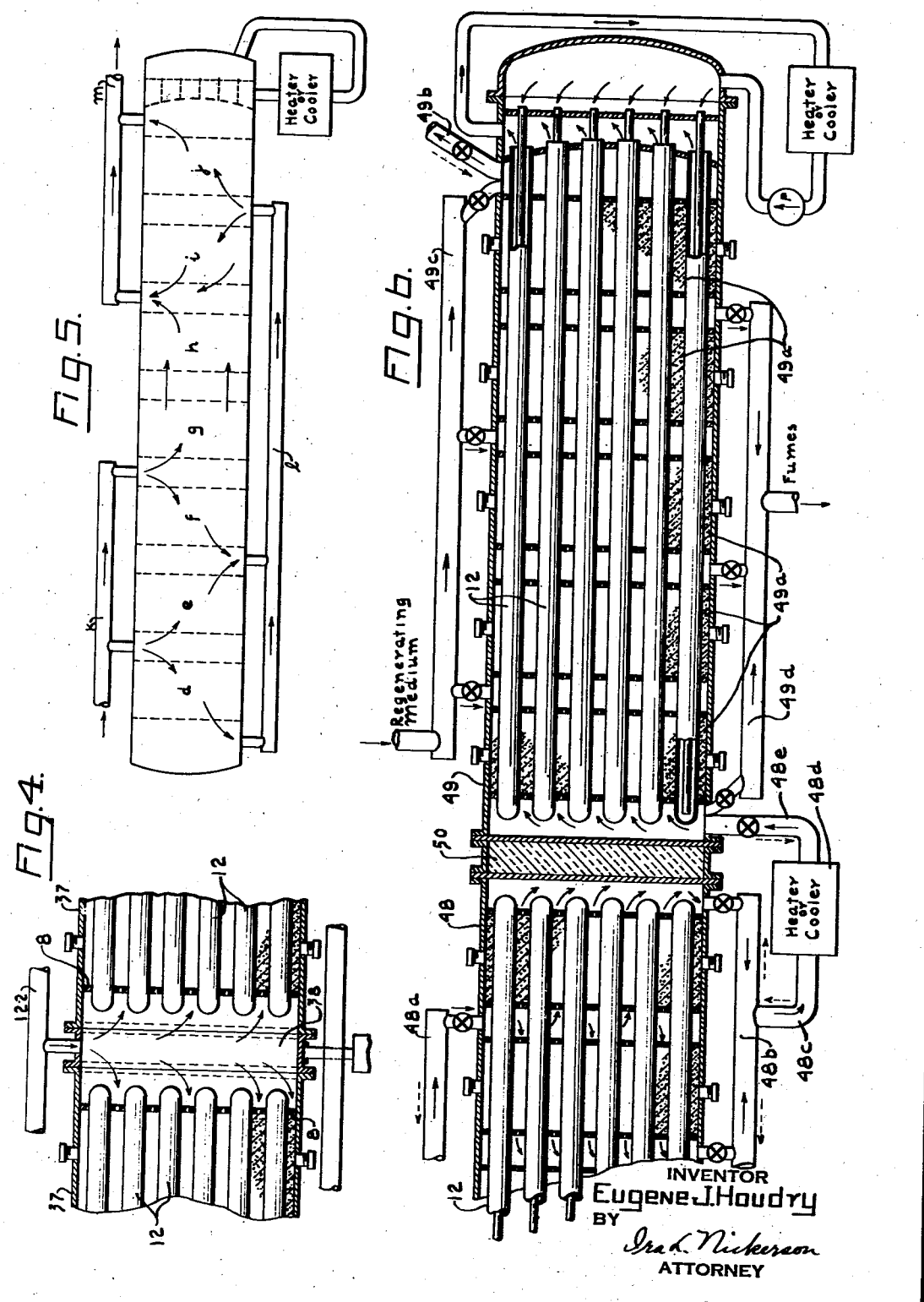
INVENTOR
Eugene J. Houdry
BY
Ira L. Nickerson
ATTORNEY Patented Mar. 19, 1940

2,193,816

UNITED STATES PATENT OFFICE 2,193,816

CHEMICAL CONVERTER

Eugene J. Houdry, Haverford, Pa., assignor to Houdry Process Corporation, Wilmington, Del., a corporation of Delaware Application October 29, 1937, Serial No. 171,700

4 Claims. (Cl. 23—288)

This invention relates to chemical reactions and more particularly to apparatus suitable therefor. It is especially concerned with the treatment, modification, conversion and transformation of fluids by reactions which may involve decomposition, synthesis or metathesis, or some or all of them. Such reactions frequently require or may be speeded up by the use of contact masses, some of which masses serve merely as spreading material while others catalytically promote the reaction or even actively enter into the reaction. Chemical reactions are rarely effected without change of temperature but are usually either endothermic or exothermic. If the absorption or liberation of heat is substantial, temperature control of the contact mass or masses is essential to prevent the reaction from ceasing on the one hand or from going beyond the desired stage into that of secondary reactions which usually destroy or impair the products already made.

Temperature control of laboratory apparatus is quite easy to attain, but when the reaction is translated to large scale commercial operations, problems of a highly complex and difficult nature must be solved. As a result, a manufacturer has often had to decide either to build very complicated and costly apparatus or to use cheaper apparatus and accept lower yields, poorer products, etc.

One object of the invention is to devise large scale apparatus which is relatively simple and yet very efficient in directing and controlling chemical reactions. Another object is to make the apparatus readily adaptable to any desired or required depth of bed of catalytic or other contact material. Another object is to provide reaction chambers of large capacity in which the contact material can be easily replaced. Another object is to secure a high degree of uniformity in the time as well as in the extent and character of the reaction. Still another object is to simplify the installation, inspection and repair of the temperature controlling system. Still another object is to provide safe apparatus regardless of the heat exchange fluid utilized for temperature control. Another object is to secure high yields of desired products and improved methods of operation. Other objects will be apparent from the detailed description which follows.

The invention provides a casing or converter divided on its interior into a plurality of chambers or compartments. Some and preferably alternate ones of these chambers are utilized as reaction chambers, while the others serve for the admission of fluid reactants and egress of fluid products. The converter is preferably disposed in a horizontal or substantially horizontal position to facilitate access to the same for charging the reaction chambers with contact material, etc. Heat exchange means for controlling the reaction extend within the case from at least one end thereof and traverse the reaction chambers as well as most, if not all, of the inlet and outlet chambers for reactants. To increase catalytic capacity, two cases may be mounted end to end and operated as a unit. Contact masses of different types and catalysts differing in degree and extent of activity may be utilized at the same time and under substantially the same temperature conditions. The invention also provides for the use of the same or different catalysts operating under different temperature conditions.

Fig. 4 is a fragmentary longitudinal vertical sectional view showing an end to end mounting arrangement of casings to produce a larger converter of the general type shown in Fig. 1;

Fig. 5 is a side elevational view on a smaller scale, partly diagrammatic and partly in section, to illustrate a variation in the use of the converter; and Fig. 6 is a longitudinal vertical sectional view of a modified form of converter utilizing two heat exchange systems for operating parts thereof at different temperatures.

Figures 1, 2, 3:
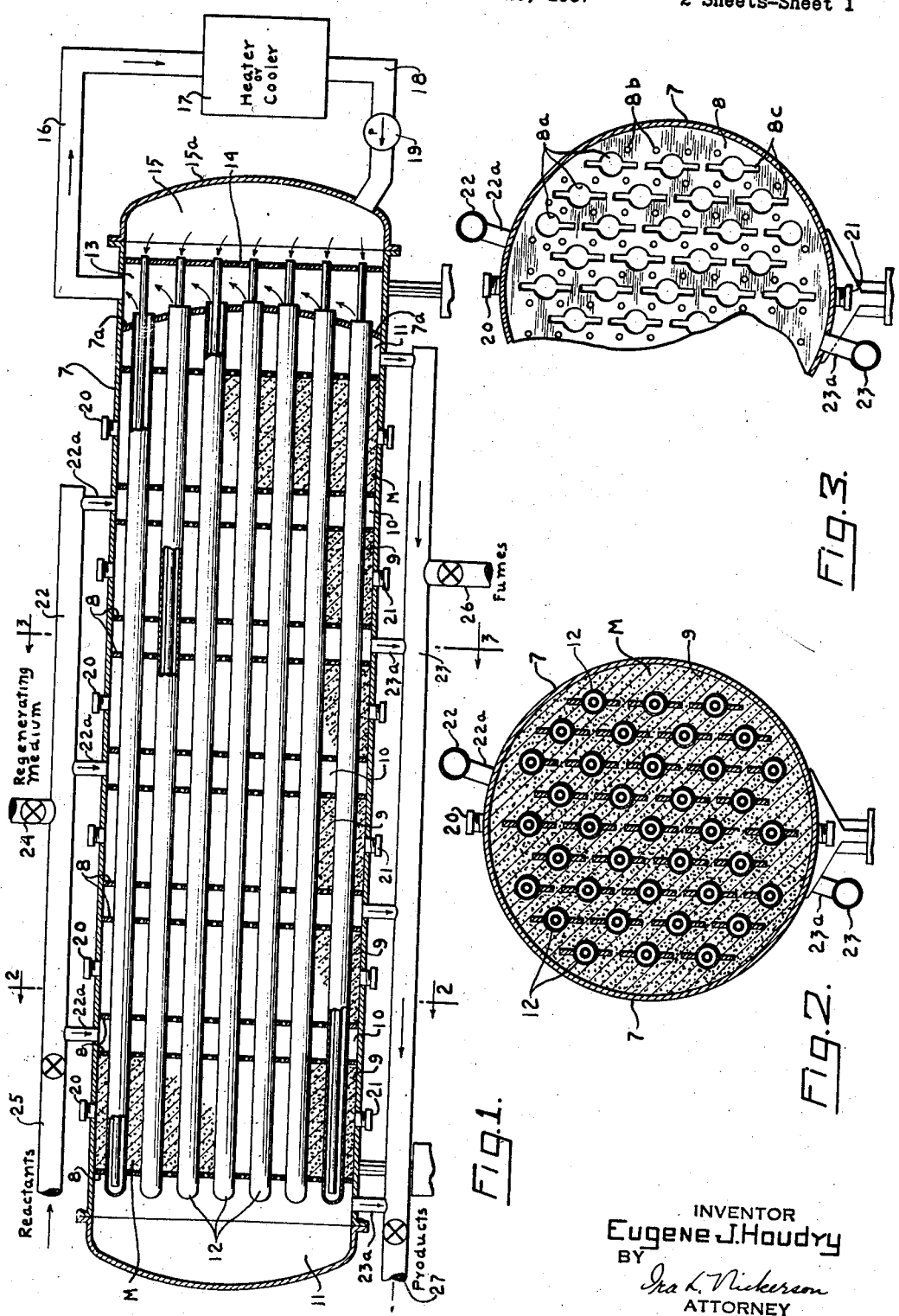
Fig. 1 is a longitudinal vertical sectional view through one form of converter.
Fig. 2 is a transverse sectional view on a larger scale and substantially on the line 2—2 of Fig. 1, showing a slight modification of the heat exchange units.
Fig. 3 is a fragmentary sectional view on the line 3—3 of Fig. 1 and on the scale of Fig. 2, illustrating the modified form of partition to accommodate the heat exchange units of Fig. 2 but omitting illustration of such units.

The converter illustrated in Fig. 1 comprises an elongate casing 7, circular in cross-section as indicated, or of any other desired cross-sectional configuration. The interior of the converter is divided by transverse perforated partitions 8 disposed at intervals and arranged to divide the interior into a series of reaction chambers 9 of substantially the same size, as well as to form intervening chambers 10 and end chambers 11 for reactants and fluid products of the reaction. The partitions 8 have large perforations 8a (Fig. 3) disposed in alignment for receiving heat exchange members 12 and smaller perforations 8b for the passage of reactants or reaction products into or from reaction chambers 9. The heat exchange units 12 shown are of the return flow type, comprising inner and outer nested conduits, and extend through the large perforations 8a of partitions 8 substantially from end to end of the converter. As shown in Fig. 1, the outer conduits or tubes of these units are mounted in dished head 7a of the converter, to open into outlet chamber 13 of the heat exchange system, while the inner conduits of units 12 extend across outlet chamber 13 and are mounted in a partition 14 which defines one end of inlet chamber 15 of the heat exchange system. The remainder of the heat exchange system comprises outlet conduit 16 connecting chamber 13 with a suitable heater or cooler 17 for modifying the temperature of the heat exchange medium, and a return pipe 18, which includes pump 19, for returning the heat exchange medium to the inlet chamber 15.

It will be noted that the nested heat exchange units 12 extend through all of the reaction chambers 9 as well as through the intervening chambers 10 for reactants and reaction products, also through one end chamber 11 (at the right) and into the other end chamber 11. Thus, by sending the heat exchange medium at the proper rate into the inner conduits of units 12 and back through the outer conduits of such units, the entire converter, as well as the reactants and the reaction products, can be maintained at substantially one temperature, or at least within a narrow range of temperature, the reverse flow movement of the heat exchange medium serving to equalize temperatures throughout the converter. If the reaction is mildly endothermic or exothermic, the heat exchange medium can be sent into the units 12 at a temperature close to that desired for the reaction. For strongly exothermic or endothermic reactions, the heat exchange fluid sent into the inner tubes of units 12 will be considerably above or considerably below the desired reaction temperature, in order to furnish the necessary heat to support the reaction, in the one instance, or to remove the excess heat of the reaction in the other instance.

Each reaction chamber 9 can be conveniently filled or emptied of contact material by the provision of one or more capped openings 20 (Figs. 1 and 2), communicating with the upper part of each of such chambers, and similar capped outlets 21 at the bottom of each chamber. Longitudinally of the converter extends one or more supply manifolds 22 for reactant fluids, communicating, by branches 22a, with the first, third and fifth of chambers 10 (counting from the left in Fig. 1); while one or more outlet manifolds 23 for reaction products communicate, by branches 23a, with the end chambers 11 and the remaining fluid chambers 10 (the second and the fourth, counting from the left). If the contact material M disposed in the various reaction chambers becomes contaminated with deposits, so as to require regeneration from time to time, inlet manifold 22 will have a valved connection 24 to a source of regenerating medium, as well as a valved connection 25 for supplying the material to be treated. Similarly, outlet manifold 23 will have a valved connection 26 for the venting of fumes or other products of regeneration, as well as a valved outlet 27 for the desired products of the reaction. Two or more converters will normally be used, to insure continuous operation in case of shut-downs for repairs or changes, and for the usual change-over for purging and cleaning of the mass by treatment with solvents or by oxidation, when regeneration is required.

In the forms of the invention shown in Figs. 1, 4 and 6, plain pipes or tubes are used for the nested heat exchange units 12. To reduce the number of such units and yet secure the same or substantially the same degree and extent of heat exchange with contact material M, the conduits, especially the outer ones, may be provided with fins of any desired type and arrangement. It is preferable, however, that the fins be so arranged as not to interfere with the charging or discharging of contact mass M. One form of fin arrangement is illustrated, by way of example and as a modification, in Fig. 2 of the drawing. When fins are used, the large openings 8a (for units 12) in partitions 8 will be suitably enlarged as by slots, such as 8c (Fig. 3) to accommodate the fins.

It will be understood that, in assembling the converter, partitions 8 are progressively mounted therein, beginning from the end remote from the heat exchange system, as at the left of Fig. 1. The partitions are spaced to give a path of movement for the reactants through the contact material of any desired length, as one foot, two feet, etc. The fluid chambers intervening between the contact chambers are merely of sufficient size to insure an even distribution of reactants by openings 8b throughout the depth of the converter and across the entire end area of each reaction chamber, as well as even and uniform removal of products from the opposite end area of each reaction chamber. After the partitions 8 are all in place, the heat exchange units 12 are inserted axially through the aligned openings 8a in all of the partitions 8. End closure 7a is put in position, and the outer conduits of units 12 are secured thereto to discharge therethrough into chamber 13. Partition 14 is then mounted in place and the inner conduits of units 12 secured thereto so as to receive heat exchange fluid from chamber 15, an outer closure 15a being applied to complete the converter assembly.

When converters of very large capacity are desired or required, two casings 37, similar to casing 7 of Fig. 1, may be placed end to end, as indicated in Fig. 4, and united to one another in any suitable manner, as by a flanged union 38 which is hollow and puts the interiors of both casings into direct communication with each other. Union 38 then forms a part of the wall of a fluid chamber for reactants or reaction products in cooperation with adjacent parts of casings 37 and the nearest partitions 8 of the latter. Such a converter will have duplicate heat exchange systems or at least duplicate batteries of heat exchange units 12, the free ends of which will terminate adjacent the central fluid chamber partly defined by union 38. As shown in Fig. 4, this central fluid chamber is connected to supply pipe 122.

Fig. 5 indicates diagrammatically one method of operating the forms of converters heretofore described, so as to subject reactants to the action of separate and distinct contact masses while the entire converter is maintained at substantially the same temperature. The contact masses may be of identical material, or of similar material having different degrees of catalytic activity, or of different materials having different kinds of activity. In Fig. 5, reaction chambers d, e, f and g may be filled with one type of contact material, while reaction chambers h, i and j are filled with a different contact material. Reactants are supplied by manifold k. The reactants which pass through zones d, e and f are conducted by manifold l so as to pass through reaction chambers i and j and thence out into outlet manifold m. At the same time, reactants which have passed through reaction chamber g continue through reaction chamber h into outlet line m without passing into manifold l at all. Thus every part of the reactant fluid is compelled to pass in series through two reaction zones before it can leave the converter. If regeneration of the masses in the reaction chambers is necessary, manifods m and k will be utilized to suply the regenerating medium; while the fumes or other products of regeneration will be discharged into manifold l and be withdrawn therefrom by a suitable valved outlet (not shown) and a separate outlet connection (also not shown) will be provided for the zone between reaction chambers g and h. To simplify the drawing, the heat exchange system is indicated only by inlet and outlet chambers and by the external portion of the circuit.

Fig. 6 shows a variation of the composite converter of Fig. 4 in that casings 48 and 49 in end to end disposition, as in Fig. 4, are united by an insulating joint 50 of any suitable type, which seals the interiors of the casings from direct communication with each other and permits the use of different operating temperatures as well as different contact materials in the separated parts of the converter. Casings 48 and 49 conform in general to those heretofore described, in that the interior of each is divided by transverse partitions to form fluid chambers alternating with reaction chambers adapted to contain contact material. Each section or casing has its own heat exchange system or battery of units 12 as in Fig. 4, but, instead of operating at the same or close to the same temperatures, as the converter of Fig. 4 requires, it is now possible to operate sections 48 and 49 at different temperatures. While section 48 conforms to the converter of Fig. 1 in its distribution of reactants at intervals within the converter so as to effect simultaneous and uniform operation in each of its reaction chambers, section 49 is adapted for straight-through flow of reactants during the converting or on-stream period, and for divided distribution only during non-productive or regenerating periods. The same or different catalysts may be utilized in reaction chambers or catalyst compartments 49a of section 49, as in the reaction chambers of section 48, so that the same or different reactions may be effected. Reactants may pass through either section of the converter before being sent into the other, as may be desired or required by the type of reactions. One form of operation is indicated by the full line arrows, wherein reactants supplied to section 48 by supply line 48a are distributed throughout the section after the manner indicated in Fig. 1, and pass thence into outlet manifold 48b, which is connected by line 48c, to suitable heating or cooling means indicated at 48d. Thereupon the products pass, with or without temperature change, by line 48e, into the left end of section 49, and pass from such end zone through catalyst compartments 49a in succession to leave section 49 by outlet line 49b. Conversely, the reactants may be fed in the reverse direction, as indicated by the arrows with broken shanks, as, for example, by entering section 49 by line 49b, pass from right to left through compartments 49a in succession to the left end zone of section 49, thence passing through line 48e, heater or cooler 48d, line 48c, to manifold 48b, and thence to be distributed for treatment in individual reaction zones of section 48, to leave finally by manifold 48a. In section 49, one compartment (49a) only, or as many of them as may be needed to supply the proper depth of catalyst for the reaction will be utilized.

If regeneration of section 48 is necessary, it will be effected as described for the converter shown in Fig. 1, i. e., the same manifolds being used for the regenerating medium as for the fluids to be treated. To regenerate section 49 along with section 48 to the same extent and during the same time period, manifolds are required to effect a similar distribution of the regenerating medium to each of the reaction zones 49a and a similar removal of products of regeneration uniformly therefrom. Accordingly, section 49 has a manifold 49c with valved branches extending to the right end zone and to the second and fourth fluid zones (counting from the right end zone). For the removal of products of regeneration, manifold 49d is provided, having valved branches communicating with the first and third fluid chambers (counting from the right) and with the left end zone. If parallel flow rather than straight-through flow is desired in section 49 of the converter of Fig. 6 for the on-stream reactions, then outlet line 49b is closed off and line 48e is connected to line 49c, so that the latter supplies the reactants for both the on-stream and the regenerating operations and the products of both reactions pass into line 49d.

From the above, it will be apparent that the present invention has numerous advantages. While insuring uniformity of operating conditions and efficient temperature regulation, it provides extremely large catalytic capacity. The arrangement of perforated partitions divides this great mass of contact material into any desired number of reaction zones of the same size and shape, and the connections thereto provide not only for uniform distribution of reactants, both for on-stream and regenerating operations, to each reaction zone, but also for uniform removal of products therefrom. The system of return flow members for the heat exchange system equalizes the supply or withdrawal of heat among these reaction zones. Construction of converters of this type is a simple matter. Only one set of tubular members, namely, the heat exchange units 12, extends into a reaction chamber. The fact that these units extend through aligned perforations in the numerous partitions 8 insures their maintenance in proper relative relationship and takes care of the problem of expansion and contraction. The casing or shell of the converter may be and preferably is controlled as to its temperature by the use of heat insulating material, and also if desired or required, by heat exchange means (not shown) close to or in contact with the exterior thereof in known manner, or as indicated in my copending application Serial No. 157,475, filed August 5, 1937 (Patent No. 2,161,677, issued June 6, 1939). The catalyst in any or all of the reaction chambers may be inspected, withdrawn and replaced without disturbing any other parts of the apparatus. The mounting of converter casings in interrelation, after the manner indicated in Figs. 4 and 6, increases catalytic capacity with a minimum amount of additional apparatus. Different treating operations, whether at the same or different temperatures, are easily arranged with this type of apparatus, as illustrated, for example, by the modifications shown in Figs. 5 and 6.

Any suitable or desired type of independent heat exchange medium may be utilized in the temperature controlling circuits. While gaseous fluid could be used, liquids are more efficient. Among those suitable are liquids which operate in two phases, such as water, mercury, or diphenyl, or materials which are solid at normal temperatures and which are useful as single phase heat exchange media, as, for example, fused salts and molten metals, such as lead, and various alloys of low melting point.

The invention is adapted to a wide range of reactions in vapor phase, liquid phase or mixed phase. Among these may be mentioned the oxidation of $SO_2$ into $SO_3$ and of $CO$ into $CO_2$, the conversion and refining of hydrocarbons from crude oil, coal, shale, etc., the production of alcohols, ammonia, fatty acids, etc. By way of specific example, it should be noted that converters of the type indicated in Figs. 1 to 4, inclusive, are admirably adapted to the transformation of higher boiling hydrocarbons into lower boiling hydrocarbons such as gasoline, kerosene and naphtha, the reforming of naphthas, polymerization of unsaturates, gaseous as well as liquid, hydrogenation, and reactions of a similar nature requiring contact with only a single contact mass. Converters of the types shown in Figs. 5 and 6 are useful for the desulphurizing and refining of hydrocarbons, reforming and refining of naphthas, polymerization and refining of unsaturates, and similar operations requiring subjection of a charging material sequentially to the action of two or even more contact masses at the same or at different temperatures.

I claim as my invention:

1. Apparatus for effecting chemical reactions comprising a casing having closed ends, partitions disposed at intervals in said casing and extending thereacross forming a plurality of aligned chambers, apertures in said partitions providing communication between the chambers, contact material in alternate of said chambers between the remaining chambers to provide reaction chambers, the remaining chambers including the end chambers forming manifolds for the reaction chambers, conduits joined to alternate of said manifolds for supplying reactants simultaneously thereto for passage to the reaction chambers and other conduits joined to the remaining manifolds for receiving products of reaction from the reaction chambers, and a heat exchange system comprising a plurality of conduits extending through other apertures in the partitions and all the reaction chambers and joined with inlet and outlet heat exchange manifolds for passing an independent fluid through the conduits for maintaining the reaction chambers at the desired temperature.

2. A converter comprising an elongate casing having closed ends, a plurality of transversely extending perforated partitions disposed at intervals in said casing providing a set of reaction chambers adapted to contain contact material and a second set of chambers providing fluid manifolds for and alternating with the reaction chambers, said reaction chambers being disposed between the fluid manifolds, a partition across one of the fluid manifolds dividing the casing and providing independent sections of reaction chambers and manifolds, inlet connections to alternate manifolds of one of said converter sections for supplying reactants simultaneously for treatment in the reaction chambers thereof and outlet connections to the other manifolds of the section for receiving the products of such treatment, means joining said outlet connections of the first section to the other converter section for delivering the products thereto for further treatment in its reaction chambers, and a separate group of heat exchange conduits extending longitudinally through the chambers of each converter section, each of said conduit groups being joined to separate inlet and outlet heat exchange manifolds for passing an independent heat exchange fluid through each group of conduits for independently controlling the temperature of the chambers in each section.

3. Apparatus for effecting chemical reactions comprising a casing having closed ends, partitions disposed at intervals in said casing and extending thereacross forming a plurality of aligned chambers, apertures in said partitions providing communication between the chambers, contact material in alternate of said chambers between the remaining chambers to provide reaction chambers, the remaining chambers including the end chambers forming manifolds for the reaction chambers, conduits joined to alternate of said manifolds for supplying reactants simultaneously thereto for passage to the reaction chambers and other conduits joined to the end manifolds and remaining manifolds for receiving products of reaction from the reaction chambers, other apertures in said partitions and a plurality of heat exchange units extending longitudinally of the casing through said apertures, said units comprising outer conduits closed at one end and inner conduits open at both ends extending within said outer conduits in nested relation for effecting reverse flow of fluid within said units, inlet and outlet heat exchange manifolds disposed adjacent an end wall of said converter, said units extending through said end wall and having the open ends of the outer conduits in communication with one of said heat exchange manifolds and the inner conduits in communication with the other of said heat exchange manifolds, and a pumping circuit interconnecting said heat exchange manifolds for circulating heat exchange fluid through the nested conduits.

4. Apparatus for effecting chemical reactions comprising a casing having closed ends, partitions disposed at intervals in said casing and extending thereacross forming a plurality of aligned chambers, apertures in said partitions providing communication between the chambers, contact material in alternate of said chambers between the remaining chambers to provide reaction chambers, the remaining chambers including the end chambers forming manifolds for the reaction chambers, conduits joined to alternate of said manifolds for supplying reactants simultaneously thereto for passage to the reaction chambers and other conduits joined to the end manifolds and remaining manifolds for receiving products of reaction from the reaction chambers, a plurality of heat exchange conduits having fins radiating therefrom extending longitudinally of the casing through the partitions, said partitions having slotted apertures for receiving the finned conduits and each of said conduits being joined with an inlet manifold and with an outlet manifold disposed outwardly of the casing for supplying an independent heat exchange medium to the conduits and maintaining the chambers at the desired temperature.

EUGENE J. HOUDRY.